(12) United States Patent
Goldfarb

(10) Patent No.: US 10,749,688 B2
(45) Date of Patent: Aug. 18, 2020

(54) SYSTEM AND METHOD FOR DECRYPTING COMMUNICATION EXCHANGED ON A WIRELESS LOCAL AREA NETWORK

(71) Applicant: Verint Systems Ltd., Herzliya Pituach (IL)

(72) Inventor: Eithan Goldfarb, Ness Ziona (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 196 days.

(21) Appl. No.: 15/495,067

(22) Filed: Apr. 24, 2017

(65) Prior Publication Data

US 2017/0310486 A1    Oct. 26, 2017

(30) Foreign Application Priority Data

Apr. 25, 2016  (IL) .......................................... 245299

(51) Int. Cl.
*H04L 29/06*    (2006.01)
*H04L 9/32*    (2006.01)
(Continued)

(52) U.S. Cl.
CPC .......... *H04L 9/3263* (2013.01); *G06F 21/335* (2013.01); *H04L 9/0844* (2013.01);
(Continued)

(58) Field of Classification Search
CPC ... H04L 9/3263; H04L 9/0844; H04L 63/304; H04L 63/06; H04L 63/0428;
(Continued)

(56) References Cited

U.S. PATENT DOCUMENTS 6,950,521 B1 *  9/2005  Marcovici ............. H04W 12/12
                                                              380/249
8,351,900 B2    1/2013  Lotvonen et al.
(Continued)

FOREIGN PATENT DOCUMENTS

WO    2010/116292    10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.
(Continued)

*Primary Examiner* — Jahangir Kabir
(74) *Attorney, Agent, or Firm* — Meunier Carlin & Curfman LLC

(57) ABSTRACT

Systems and methods for obtaining authentication vectors issued, for use by a mobile communication terminal, by a Home Location Register (HLR) that serves a cellular communication network independently of any cooperation with the cellular network. Further to obtaining the authentication vectors, a terminal is caused to communicate over a WiFi WLAN using an encryption key derived from the obtained authentication vectors, e.g., per the EAP-SIM or EAP-AKA protocol. Since the encryption key is known, communication from the terminal is decrypted. The authentication vectors may be obtained by (i) an "impersonating" Visitor Location Register (VLR) server that does not serve the cellular network; (ii) an interrogation device which, by imitating a legitimate base station serving the cellular network, solicits the mobile communication terminal to associate with the interrogation device; or (iii) an SS7 probe, which obtains authentication vectors communicated from the HLR server to other entities on the SS7 network.

20 Claims, 3 Drawing Sheets

(51) Int. Cl.
*G06F 21/33* (2013.01)
*H04L 9/08* (2006.01)
*H04W 12/04* (2009.01)
*H04W 12/02* (2009.01)

(52) U.S. Cl.
CPC .......... *H04L 63/0428* (2013.01); *H04L 63/06* (2013.01); *H04L 63/304* (2013.01); *H04W 12/02* (2013.01); *H04W 12/04* (2013.01); *G06F 2221/2107* (2013.01); *H04L 63/0823* (2013.01)

(58) Field of Classification Search
CPC .. H04L 63/0823; H04W 12/02; H04W 12/04; G06F 21/335; G06F 2221/2107
USPC .......................................... 723/168, 170, 175
See application file for complete search history.

(56) References Cited

U.S. PATENT DOCUMENTS

| | | | |
|---|---|---|---|
| 2003/0031322 A1* | 2/2003 | Beckmann | H04L 63/0428 380/278 |
| 2005/0202815 A1 | 9/2005 | Verma et al. | |
| 2006/0253703 A1* | 11/2006 | Eronen | H04L 63/0892 713/156 |
| 2006/0262742 A1 | 11/2006 | Dommaraju et al. | |
| 2009/0172397 A1* | 7/2009 | Kim | H04W 12/06 713/168 |
| 2009/0267730 A1* | 10/2009 | Zhang | H04L 63/061 340/5.8 |
| 2011/0150211 A1 | 6/2011 | Anderson | |
| 2014/0160955 A1* | 6/2014 | Lum | H04W 24/06 370/252 |
| 2015/0140097 A1 | 5/2015 | Goldfarb | |
| 2016/0050562 A1* | 2/2016 | Pudney | H04W 12/02 713/168 |
| 2017/0013121 A1* | 1/2017 | Baeder | H04M 3/00 |

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.
Barkan, E.P., "Cryptanalysis of Ciphers and Protocols," Research Thesis submitted to the Senate of the Technion, Israel Institute of Technology, 2006, 200 pages.
"Cell Scanning and Catcher Detection in unnoticeable pocket size," NetHawk C2, Data sheet, version 1.4, EXFO, 2010, 4 pages.
Cellusys, "SS7 Vulnerabilities," e-book, 2016, 53 pages.
Engel, T., "SS7: Locate. Track. Manipulate." 2014, 55 pages.
Girardin, F., et al., "Detecting air travel to survey passengers on a worldwide scale," Journal of Location Based Services, 2010, 26 pages.
Kostrzewa, A., "Development of a man in the middle attack on the GSM Um-Interface," Master Thesis, 2011, 88 pages.
Meyer, U., et al., "On the Impact of GSM Encryption and Man-in-the-Middle Attacks on the Security of Interoperating GSM/UMTS Networks," proceedings of the 15$^{th}$ IEEE International Symposium on Personal, Indoor and Mobile Radio Communications, 2004, pp. 2876-2883.
Mourad, H., "The Fall of SS7—How Can the Critical Security Controls Help?" The SANS Institute, 2015, 29 pages.
Nohl, K., "Mobile self-defense," Security Research Labs, 2015, 24 pages.
Radiator, EAP-SIM, EAP-AKA and EAP-AKA' Support, White Paper, Open System Consultants Pty.Ltd., 2014, 17 pages.
Signaling System 7 (SS7) Security Report, Positive Technologies, 2014, 15 pages.
Strobel, D., "IMSI Catcher," Seminararbeit, Ruhr-Universität Bochum, 2007, pp. 13-24.
Vedaldi, A., "An implementation of SIFT detector and descriptor," University of California at Los Angeles, 2007, 7 pages.

* cited by examiner

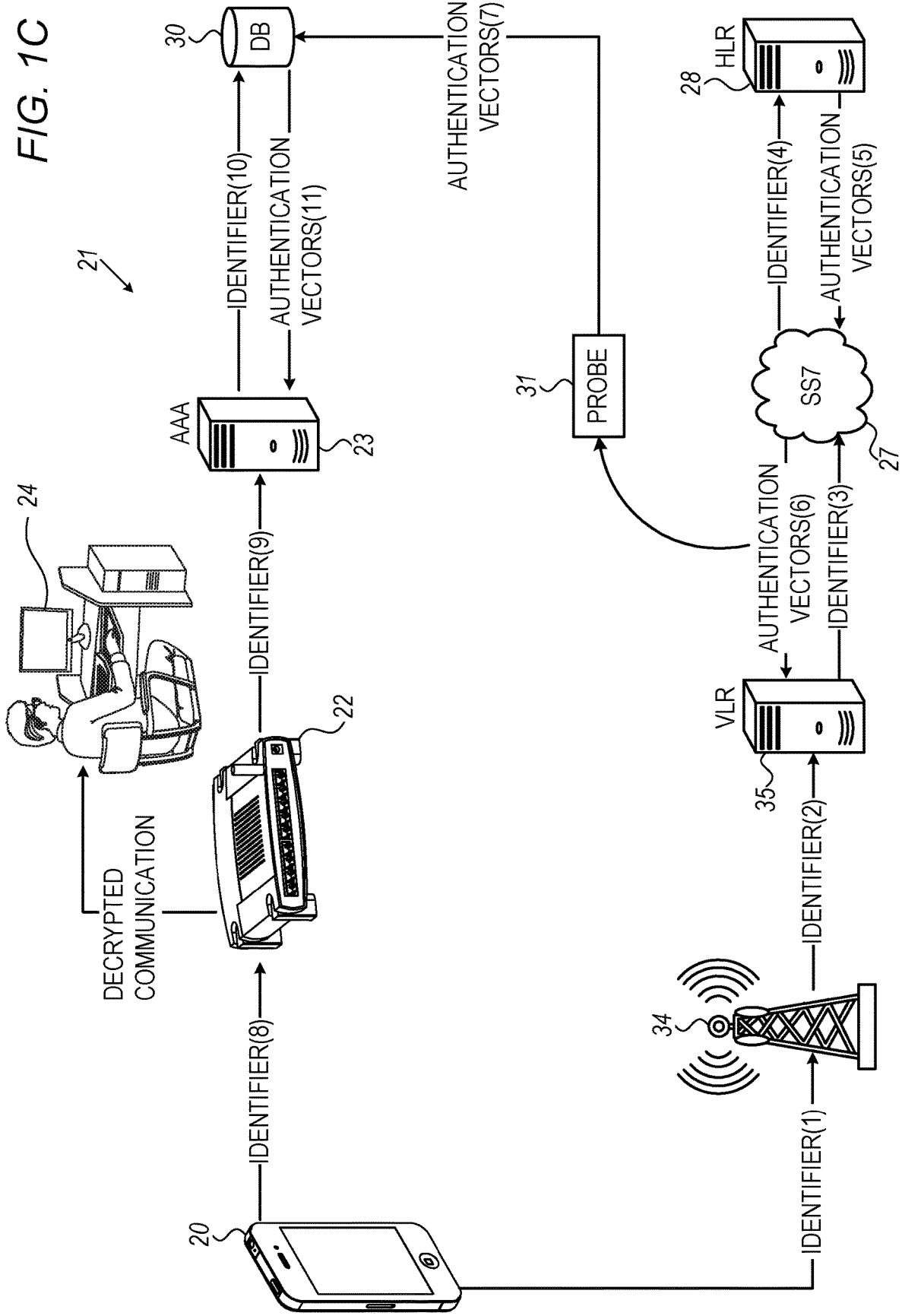

US 10,749,688 B2

SYSTEM AND METHOD FOR DECRYPTING COMMUNICATION EXCHANGED ON A WIRELESS LOCAL AREA NETWORK

FIELD OF THE DISCLOSURE

The present disclosure relates to the field of wireless communication, and in particular, to communication exchanged on a wireless local area network (WLAN).

BACKGROUND OF THE DISCLOSURE

US Publication 2011/0150211, whose disclosure is incorporated herein by reference, describes an architecture and technique to aid in the decryption of encrypted wireless signals for lawful intercept by determining the current encryption key. It may also be used to decrypt encrypted signals on internal interfaces of the wireless and wireline networks.

Kostrzewa, Adam, "Development of a man in the middle attack on the GSM Um-Interface," Apr. 15, 2011, Master thesis, Technische Universitat Berlin, which is incorporated herein by reference, presents elements of the "man-in-the-middle" attack, based on the A5/2 weakness, on the radio connection between mobile and base station.

Barkan, Elad Pinhas, "Cryptanalysis of Ciphers and Protocols," March 2006, Research thesis, Technion—Israel Institute of Technology, which is incorporated herein by reference, presents four independent contributions in the field of cryptanalysis.

Mourad, Hassan, "The Fall of SS7—How Can the Critical Security Controls Help?," 2015, The SANS Institute, which is incorporated herein by reference, discusses vulnerabilities in the Signaling System 7 (SS7) protocol, and examines the possibility of using security controls to enhance the security of SS7 interconnections.

SUMMARY OF THE DISCLOSURE

There is provided, in accordance with some embodiments of the present disclosure, a system that includes a wireless network interface and one or more processors. The processors are configured to obtain at least one authentication vector issued by a Home Location Register (HLR) server that serves a cellular network, independently of any cooperation with the cellular network. The processors are further configured to cause, subsequently, a mobile communication terminal to exchange communication with the processors, over a WiFi wireless local area network (WLAN) and via the wireless network interface, using an encryption key that is derived from the authentication vector.

In some embodiments, the processors are further configured to decrypt the communication, using the encryption key.

In some embodiments, the processors are configured:
to cause the mobile communication terminal to communicate an identifier of the mobile communication terminal to the processors, and
to obtain the authentication vector, using the identifier.

In some embodiments, the identifier is an International Mobile Subscriber Identity (IMSI).

In some embodiments, the processors are configured to cause the HLR server to communicate the authentication vector to the processors, by passing the identifier, via a Signaling System 7 (SS7) network, to the HLR server.

In some embodiments, the processors are configured to obtain the authentication vector by:
soliciting the mobile communication terminal to associate with the processors, by imitating a base station serving the cellular network, and
subsequently, deriving the authentication vector from communication exchanged between the mobile communication terminal and the processors.

In some embodiments, the processors are configured to obtain the authentication vector by monitoring communication from the HLR server over a Signaling System 7 (SS7) network, and extracting the authentication vector from the monitored communication.

In some embodiments, the encryption key is derived from the authentication vector in accordance with an Extensible Authentication Protocol (EAP) selected from the group consisting of: EAP-Subscriber Identity Module (EAP-SIM), and EAP-Authentication and Key Agreement (EAP-AKA).

There is further provided, in accordance with some embodiments of the present disclosure, a method. The method includes, using one or more processors, obtaining at least one authentication vector issued by a Home Location Register (HLR) server that serves a cellular network, independently of any cooperation with the cellular network. The method further includes, using the one or more processors, subsequently causing a mobile communication terminal to exchange communication with the processors, over a WiFi wireless local area network (WLAN), using an encryption key that is derived from the authentication vector.

There is further provided, in accordance with some embodiments of the present disclosure, a computer software product including a tangible non-transitory computer-readable medium in which program instructions are stored. The instructions, when read by one or more processors, cause the processors to obtain at least one authentication vector issued by a Home Location Register (HLR) server that serves a cellular network, and to cause, subsequently, a mobile communication terminal to exchange communication with the processors, over a WiFi wireless local area network (WLAN), using an encryption key that is derived from the authentication vector.

The present disclosure will be more fully understood from the following detailed description of embodiments thereof, taken together with the drawings, in which:

BRIEF DESCRIPTION OF THE DRAWINGS

FIGS. 1A-C are schematic illustrations of respective embodiments of a method for causing a mobile communication terminal to exchange communication with an access point for a WiFi WLAN, in accordance with some embodiments described herein.

DETAILED DESCRIPTION OF EMBODIMENTS

Overview

Figure 1A:
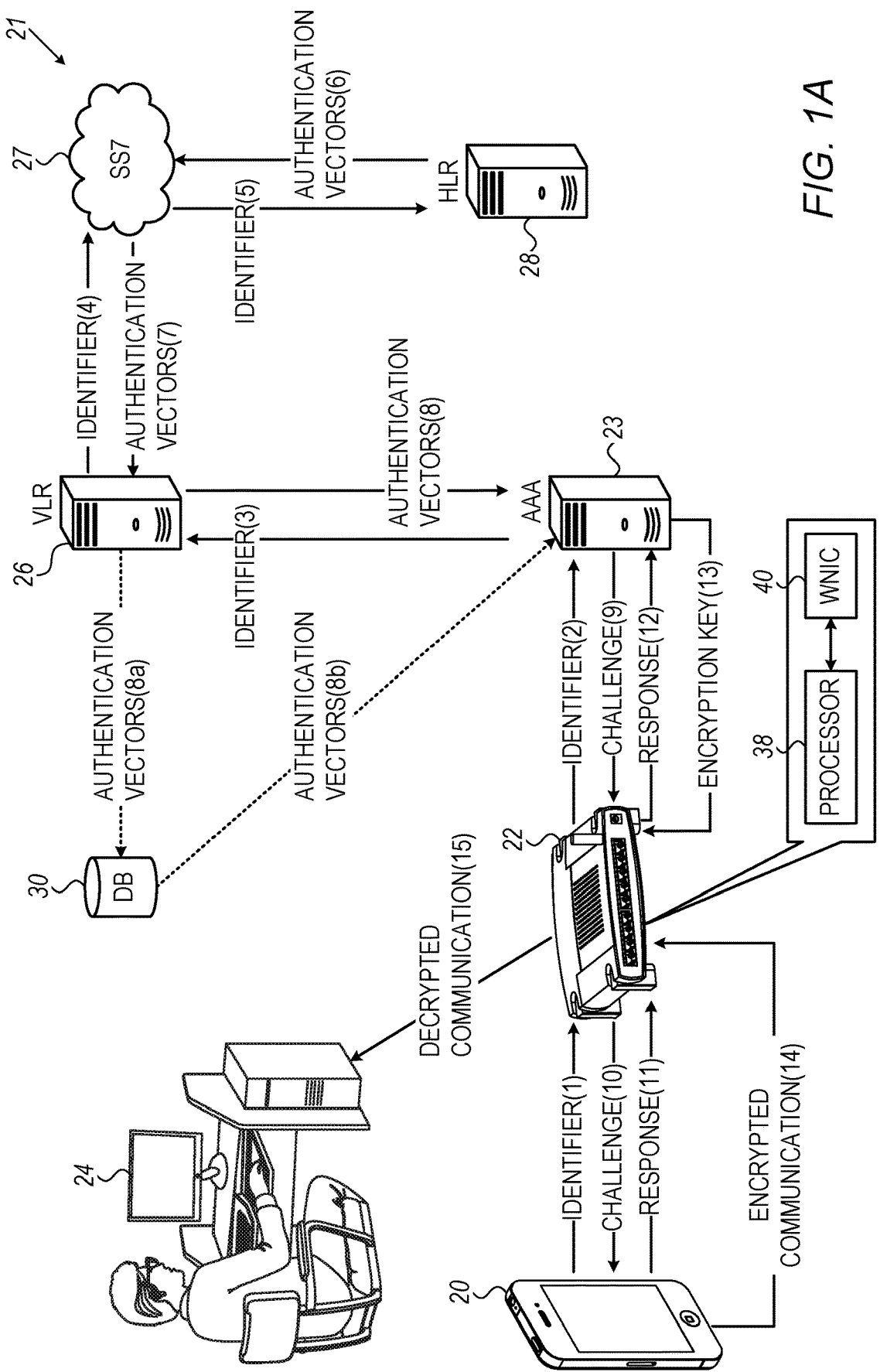

Extensible Authentication Protocol (EAP) is an authentication framework frequently used in WiFi WLANs. EAP includes various methods (or "mechanisms") for authentication. For example, EAP-SIM is used for authentication and session key distribution using the Subscriber Identity Module (SIM) of the Global System for Mobile Communications (GSM). As another example, EAP-AKA, where "AKA" stands for Authentication and Key Agreement, is an EAP mechanism for authentication and session key distribution using the Universal Mobile Telecommunications System (UMTS) Subscriber Identity Module (USIM).

In some EAP methods, such as EAP-SIM and EAP-AKA, a terminal that is requesting to use a WiFi access point communicates an identifier (typically, a temporary identifier, such as a Temporary Mobile Subscriber Identity (TMSI)) of the terminal to the access point. The access point then communicates the identifier to an Authentication, Authorization and Accounting (AAA) server, which uses the identifier to request a plurality of authentication vectors from the Home Location Register (HLR) server of the cellular network that serves the terminal. Upon receiving the authentication vectors, the AAA server communicates, via the access point, a challenge to the terminal, in which the terminal must compute a value derived from the authentication vectors. If the terminal responds successfully to the challenge, the AAA server derives an encryption key from the authentication vectors, and passes the encryption key to the access point. In parallel, the terminal derives the same encryption key from the authentication vectors. The terminal and access point are thus authorized to begin exchanging communication with one another, using the encryption key for encryption and decryption.

In some cases, law enforcement entities, security-monitoring entities, or other entities may wish to monitor communication exchanged over a WLAN. A challenge in performing such monitoring is that, as described above, communication exchanged under EAP methods such as EAP-SIM and EAP-AKA is encrypted, such that unless the encryption key, and/or authentication vectors from which the encryption key is derived, are known, the communication typically cannot be decrypted. Moreover, since such entities are not recognized as partners of the cellular network, the entities cannot request authentication vectors from the cellular network.

To address the above challenge, the present disclosure provides systems and methods for obtaining authentication vectors issued, for use by a mobile communication terminal, by a Home Location Register (HLR) that serves a cellular communication network, even independently of any cooperation with the cellular network (i.e., even without partnering or otherwise cooperating with the cellular network). Further to obtaining the authentication vectors, the terminal is caused to communicate over a WiFi WLAN using an encryption key derived from the obtained authentication vectors, e.g., per the EAP-SIM or EAP-AKA protocol. Since the encryption key is known, communication from the terminal may be decrypted.

Typically, embodiments described herein provide an AAA server, such as a Remote Authentication Dial-In User Service (RADIUS) server, which is configured to imitate the behavior of a "legitimate" AAA server in almost all respects. For example, the provided AAA server passes challenges, via the access point, to the mobile terminal, and, upon a challenge being answered correctly, derives an appropriate encryption key for communication. The provided AAA server differs from a legitimate AAA server, however, in that the provided AAA server uses authentication vectors that were obtained using the methods described herein, rather than using authentication vectors received, via the normal authorized channels, from the HLR server that serves the cellular network. Embodiments described herein further provide an access point that is configured to communicate with both the provided AAA server and the "target" mobile communication terminal.

The present description describes three specific techniques by which the authentication vectors may be obtained, as follows:

(i) In some embodiments, there is further provided an "impersonating" Visitor Location Register (VLR) server that does not serve the cellular network. First, the provided VLR server obtains access to the SS7 network. Subsequently, by imitating the behavior of a legitimate VLR server, the provided VLR server uses the SS7 protocol to obtain the authentication vectors from the HLR server. The AAA server then obtains the authentication vectors from the provided VLR server.

(ii) In other embodiments, there is further provided an interrogation device which, by imitating a legitimate base station serving the cellular network, solicits the mobile communication terminal to associate with the interrogation device. Subsequently, the terminal exchanges communication with the interrogation device, using an encryption key that is derived from authentication vectors provided by the HLR server. By using a deciphering server to decrypt the communication, the interrogation device obtains these authentication vectors, and stores them in a database. The AAA server then retrieves the authentication vectors from the database.

(iii) In yet other embodiments, there is further provided an SS7 probe, which obtains authentication vectors communicated from the HLR server to other entities on the SS7 network. The probe stores the authentication vectors in a database, and the authentication vectors are subsequently retrieved from the database by the AAA server.

Embodiments described herein may be used for any suitable authentication method, including EAP-SIM and EAP-AKA. In the EAP-SIM method, each authentication vector—per the GSM protocol—includes a random number, an expected-response number derived from the random number, and a session key derived from the random number. In the EAP-AKA authentication method, each authentication vector—per the UMTS communication protocol—includes, in addition to a random number, an expected-response number, and a session key, (i) an authentication token derived from the random number, and (ii) an integrity key derived from the random number.

System Description

Figure 1B:
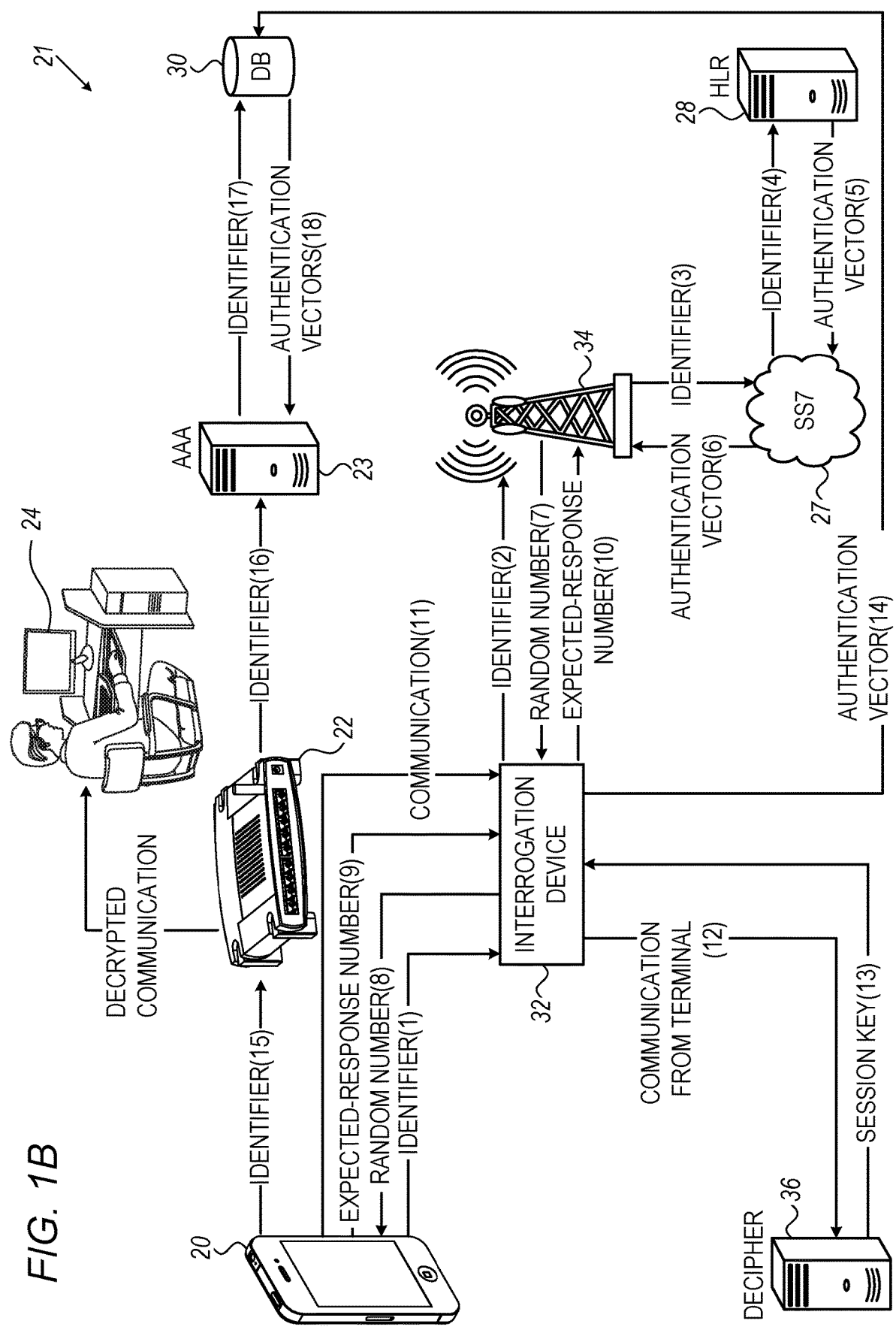

Reference is made to FIGS. 1A-C, which are schematic illustrations of respective embodiments of a system 21 for causing a mobile communication terminal 20 to exchange communication with an access point 22 for a WiFi WLAN, in accordance with some embodiments described herein. As described above, access point 22 is provided by the entity that wishes to monitor communication exchanged with mobile communication terminal 20. In each of the embodiments, mobile communication terminal 20 is caused to use a known encryption key to communicate, over a WiFi WLAN, with access point 22. Typically, communication between the mobile communication terminal and access point 22 is decrypted by the access point, and is copied to a remote server 24 for further analysis.

As shown in FIG. 1A, access point 22 typically comprises a processor 38, as well as a wireless network interface, such as a wireless network interface controller (WNIC) 40. Processor 38 transmits communication, and receives communication transmitted to the access point, via WNIC 40. As further described below, system 21 may also comprise an AAA server 23, a VLR server 26, an interrogation device 32, a deciphering server 36, and/or a probe 31. Each of these system components typically also comprises a respective processor that is cooperatively networked with processor 38, such that the processors collectively perform the techniques described herein. (For simplicity, the figures do not explicitly show a separate processor for each of these system components.)

In some embodiments, two or more of access point 22, AAA server 23, VLR server 26, interrogation device 32, and deciphering server 36 are physically co-located (e.g., by being disposed on a common wireless router or a common computer), and/or share a common processor. For such embodiments, references below to communication between system components may indicate communication between processes. For example, the description of FIG. 1A below refers to access point 22 communicating an identifier to AAA server 23. For embodiments in which a single processor performs the functions of both access point 22 and AAA server 23, this means that the "access-point process" of the processor communicates the identifier to the "AAA-server process" of the processor, e.g., by storing the identifier, in memory, for subsequent retrieval by the AAA-server process.

In general, processor 38, and any other processor belonging to system 21, may be embodied as a single processor, or as a cooperatively networked or clustered set of processors. Processor 38, and any other processor belonging to system 21, is typically a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the computer in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

FIG. 1A

In FIG. 1A, the access point first causes the mobile communication terminal to communicate an identifier of the mobile communication terminal, such as an International Mobile Subscriber Identity (IMSI) of the mobile communication terminal, to the access point. (As noted above, in EAP methods, the mobile communication terminal typically does not provide to the access point a permanent identifier such as an IMSI.) The communication of the identifier to the access point is indicated in the figure with an appended "(1)," indicating that the communication of the identifier to the access point is performed prior to the other steps depicted in the figure. Similarly, throughout FIGS. 1A-C, the appended parenthesized numerals indicate the order in which the steps of the method are performed.

The access point then communicates the identifier to AAA server 23, which is also provided by the monitoring entity. AAA server 23 is configured to communicate with VLR server 26, which is provided by the monitoring entity, rather than with a legitimate VLR server that serves the cellular network that serves the mobile communication terminal. AAA server 23 passes the identifier to VLR server 26.

VLR server 26 first obtains access to SS7 network 27, e.g., by accepting a relevant commercial offering of a service provider, as described in the aforementioned article by Mourad, which is incorporated herein by reference. Subsequently, VLR server 26 pretends to be a legitimate VLR server, by passing the identifier, via the SS7 network, to the HLR server 28 serving the cellular network that serves terminal 20, and requesting authentication vectors from HLR server 28. HLR server 28 then uses the identifier to generate the authentication vectors, and passes the authentication vectors, via the SS7 network, to VLR server 26, as if VLR server were a legitimate VLR server. The VLR server then passes these authentication vectors to the AAA server. Alternatively, the VLR server stores the authentication vectors in a database (DB) 30, from which the AAA server subsequently retrieves the authentication vectors.

Subsequently, AAA server 23 passes, to access point 22, a challenge that is based on the authentication vectors, and access point 22 forwards the challenge to terminal 20. Terminal 20 calculates a response to the challenge, and then communicates the response, via the access point, to the AAA server. Upon receiving the response, the AAA server derives the encryption key from the authentication vectors, and communicates the encryption key to the access point. (Alternatively, the AAA server may derive the encryption key before receiving the response.) The terminal also derives the encryption key.

Subsequently, the terminal and the access point begin exchanging communication with one another, the communication being encrypted using the encryption key. The access point uses the encryption key to decrypt the communication, and passes the decrypted communication to remote server 24.

The embodiment of FIG. 1A, as described above, may provide the authentication vectors in real-time. That is, the authentication vectors may be obtained from the HLR server (via the impersonating VLR server) following the request by terminal 20 to use the access point. Alternatively, as noted above, the authentication vectors may be obtained in advance and stored in a database, and afterwards—upon the terminal requesting to use the access point—retrieved from the database.

In contrast, in the embodiments of FIGS. 1B-C, described immediately below, the authentication vectors are generally obtained only in advance, rather than in real-time.

FIG. 1B

By way of introduction, in GSM cellular communication, a base station belonging to a cellular network communicates a random number to the device that is requesting to use the cellular network. The device then derives a number from the random number, and returns the derived number to the base station. If the derived number is as expected, i.e., it matches the expected-response number, the device is authenticated, and may thus begin to use the base station. GSM communication then begins, using an encryption key derived from an authentication vector that includes the random number, the expected-response number, and a session key that is derived from the random number.

The embodiment of FIG. 1B utilizes the above-described GSM protocol to obtain authentication vectors for EAP-SIM communication, which is based on the GSM protocol. First, an interrogation device 32 (or "fake base station") that imitates a base station serving the cellular network solicits the mobile communication terminal to associate with interrogation device 32, rather than with a legitimate base station serving the network. In soliciting the terminal, the interrogation device obtains an identifier, such as an IMSI, of the terminal. Subsequently, the interrogation device, imitating the behavior of the terminal, communicates the identifier to a legitimate base station 34 belonging to the network. Base station 34 communicates the identifier, via the SS7 network, to HLR server 28. Upon receiving the identifier, the HLR server generates a GSM authentication vector, and passes the vector, via the SS7 network, to base station 34. The GSM authentication vector includes a random number, an expected-response number derived from the random number, and a session key derived from the random number.

Subsequently, the base station, treating the interrogation device as if the interrogation device were the mobile terminal, passes the random number from the authentication vector to the interrogation device. The interrogation device, imitating the behavior of the base station, then communicates the random number to the terminal. The terminal computes the expected-response number, and passes the expected-response number to the interrogation device. Subsequently, the interrogation device, again imitating the terminal, passes the expected-response number to the base station. Upon receiving the expected-response number, the base station authenticates the interrogation device, and the interrogation device, again imitating the base station, authenticates the terminal. (The authentication steps are not explicitly shown in the figure.) The terminal then begins to exchange communication with the base station, with the interrogation device acting as the "man in the middle." The communication is encrypted using an encryption key derived from the authentication vector.

The embodiment of FIG. 1B further provides a deciphering server 36. Upon receiving the encrypted communication from the terminal (or from the base station), the interrogation device passes the communication to deciphering server 36. Using GSM-decryption techniques known in the art, the deciphering server breaks the encryption, thus obtaining the session key, which the deciphering server passes to the interrogation device. Upon receiving the session key, the interrogation device possesses the entire authentication vector. The interrogation device stores the authentication vector in database 30, for future use.

The above process is repeated several times, until database 30 stores a sufficient number of authentication vectors for terminal 20. Subsequently, upon a request from terminal 20 to use the access point, the access point requests the relevant identifier (e.g., the IMSI) of the terminal, and passes the identifier to the AAA server. The AAA server then uses the identifier to retrieve, from the database, authentication vectors that were generated for use by the terminal. (Typically, database 30 stores authentication vectors for a plurality of terminals, each authentication vector being associated in the database with the identifier of the terminal for which the authentication vector was issued.) The order of events then proceeds as in FIG. 1A; the AAA server, via the access point, communicates a challenge to the device, the device responds to the challenge, etc. (Due to these steps being the same as in FIG. 1A, these steps are not explicitly shown in FIG. 1B.) Again, as in FIG. 1A, the access point derives the encryption key from the authentication vectors, uses the encryption key to break the encryption, and passes the decrypted communication to the remote server.

Interrogation devices that solicit mobile phones by imitating the operation of a legitimate base station are sometimes referred to as "IMSI catchers." Examples of IMSI catching techniques are described, for example, by Strobel in "IMSI Catcher," Jul. 13, 2007, which is incorporated herein by reference, by Asokan et al., in "Man-in-the-Middle Attacks in Tunneled Authentication protocols," the 2003 Security Protocols Workshop, Cambridge, UK, Apr. 2-4, 2003, which is incorporated herein by reference, and by Meyer and Wetzel in "On the Impact of GSM Encryption and Man-in-the-Middle Attacks on the Security of Interoperating GSM/UMTS Networks," proceedings of the 15$^{th}$ IEEE International Symposium on Personal, Indoor and Mobile Radio Communications, Barcelona, Spain, Sep. 5-8, 2004, pages 2876-2883, which is incorporated herein by reference.

FIG. 1C

In FIG. 1C, like FIG. 1B, authentication vectors are stored, in advance, in database 30, and are later retrieved from the database, by AAA server 23, upon receiving a request from a mobile communication terminal to begin communication. In FIG. 1C, however, unlike FIG. 1B, the authentication vectors are initially obtained from HLR server 28 via a probe (or "sniffer") 31 that monitors communication on the SS7 network, e.g., as described in U.S. Patent Application 2016/0269900, whose disclosure is incorporated herein by reference.

For example, FIG. 1C shows terminal 20 initiating communication with base station 34, by communicating an identifier (such as an IMSI) to the base station. The base station passes the identifier to a VLR server 35, which, via the SS7 network, forwards the identifier to the HLR server. (VLR server 35, in contrast to VLR server 26 (FIG. 1), is a legitimate VLR server belonging to the cellular network.) Upon receiving the identifier, the HLR server generates a plurality of authentication vectors, and, via the SS7 network, communicates the authentication vectors to the VLR server. Probe 31 extracts the authentication vectors from the communication from the HLR server, and stores the authentication vectors in database 30.

Subsequently, upon a request from terminal 20 to use the access point, authentication vectors are retrieved from the database, as described above with reference to FIG. 1B.

In general, it is noted that the authentication vectors retrieved from database 30 by AAA server 23 may have been originally stored in the database per any one or more of the methods described herein. For example, the AAA server may retrieve three authentication vectors: one that was stored in the database by VLR server 26 (FIG. 1A), one that was stored by interrogation device 32 (FIG. 1B), and one that was stored by probe 31.

Notwithstanding the above, there is an important difference between the embodiment of FIG. 1A and the embodiments of FIGS. 1B-C. Whereas, in the embodiment of FIG. 1A, the authentication vectors stored in database 30 are unused, in the embodiments of FIGS. 1B-C, the authentication vectors stored in the database have already been used for cellular communication. Such prior use may prevent these authentication vectors from being used with the EAP-AKA authentication method, as well as any other authentication method that is based on a communication protocol that defends against "replay attacks." Typically, therefore, each authentication vector stored in the database includes an indication as to whether the authentication vector has already been used. The AAA server may then, if appropriate, retrieve only unused authentication vectors.

In general, the scope of the present disclosure is not limited to the particular embodiments shown in FIGS. 1A-C. Rather, the scope includes any embodiment in which at least one authentication vector, issued by an HLR server that serves a cellular network, is obtained without partnering or otherwise cooperating with the cellular network, and is subsequently used to derive an encryption key for communication between a mobile communication terminal and an access point for a WiFi WLAN, as described above. Moreover, the scope of the present disclosure includes obtaining any suitable number of authentication vectors, in real-time and/or in advance, as required by the particular authentication method used by the WLAN.

It will be appreciated by persons skilled in the art that the present disclosure is not limited to what has been particularly shown and described hereinabove. Rather, the scope of the present disclosure includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system comprising:
   one or more digital computing devices comprising:
     an access point;
     an authentication, authorization and accounting (AAA) server; and
     a first Visitor Location Register (VLR) server external to a cellular network;
   wherein the access point is configured to receive an identifier from a mobile communication terminal connected to the cellular network and to transmit the identifier to the AAA server, the access point separate from the mobile communication terminal; and
   wherein the AAA server is configured to transmit the identifier from the mobile communication terminal to the first VLR server, the first VLR server in communication with a Home Location Register (HRL) server for the cellular network and configured to receive an authentication vector from the HRL in response to transmitting the identifier to the HRL and further configured to provide the authentication vector to the AAA server;
   wherein the first VLR server is separate from a second legitimate VLR server internal to the cellular network, thereby causing the mobile communication terminal to exchange communication with the digital computing devices, over a WiFi wireless local area network (WLAN) and using the access point, using an encryption key that is derived from the authentication vector.

2. The system according to claim 1, wherein the digital computing devices are further configured to decrypt the communication, using the encryption key.

3. The system according to claim 1, wherein the identifier is an International Mobile Subscriber Identity (IMSI).

4. The system according to claim 1, wherein the digital computing devices are configured to cause the HLR server to communicate the authentication vector to the digital computing devices, by passing the identifier, using an SS7 network, to the HLR server.

5. The system according to claim 1, wherein the digital computing devices are configured to obtain the authentication vector by:
   soliciting the mobile communication terminal to associate with the digital computing devices, by imitating a base station serving the cellular network, and
   subsequently, deriving the authentication vector from communication exchanged between the mobile communication terminal and the digital computing devices.

6. The system according to claim 1, wherein the digital computing devices are configured to obtain the authentication vector by monitoring communication from the HLR server over an SS7 network, and extracting the authentication vector from the monitored communication.

7. The system according to claim 1, wherein the encryption key is derived from the authentication vector in accordance with an Extensible Authentication Protocol (EAP) selected from the group consisting of: EAP-Subscriber Identity Module (EAP-SIM), and EAP-Authentication and Key Agreement (EAP-AKA).

8. The system of claim 1, wherein the authentication vector is issued by the HRL by using at least one of (i) a Visitor Location Register (VLR) server that uses a Signaling System 7 (SS7) protocol, obtains access to an SS7 network, uses the SS7 protocol to obtain the at least one authentication vector from the HLR server, and does not serve the cellular network, (ii) an interrogation device that operates independently of any cooperation with the cellular network to obtain the at least one authentication vector from the HLR server, or (iii) an SS7 probe which obtains the at least one authentication vector issued by the HLR server to entities on the SS7 network.

9. A method, comprising, using one or more processors:
   receiving at an access point, an identifier from a mobile communication terminal connected to a cellular network;
   transmitting the identifier from the access point to an authentication, authorization and accounting (AAA) server, the access point separate from the mobile communication terminal; and
   transmitting the identifier of the mobile communication terminal from the AAA server to a first Visitor Location Register (VLR) server, the first VLR server in communication with a Home Location Register (HRL) server for the cellular network;
   transmitting the identifier of the mobile communication terminal from the first VLR to the HLR;
   receiving from the HRL an authentication vector in response to transmitting the identifier to the HLR;
   providing the authentication vector to the AAA server, wherein the first VLR server is separate from a legitimate VLR server for internal to the cellular network; and
   subsequently, causing the mobile communication terminal to exchange communication with the processors, over a WiFi wireless local area network (WLAN), using an encryption key that is derived from the authentication vector.

10. The method according to claim 9, further comprising decrypting the communication, using the encryption key.

11. The method according to claim 9, wherein the identifier is an International Mobile Subscriber Identity (IMSI).

12. The method according to claim 9, wherein obtaining the authentication vector comprises causing the HLR server to communicate the authentication vector to the processors, by passing the identifier, using the SS7 network, to the HLR server.

13. The method according to claim 9, further comprising:
   soliciting the mobile communication terminal to associate with the processors, by imitating a base station serving the cellular network, and subsequently, deriving the authentication vector from communication exchanged between the mobile communication terminal and the processors.

14. The method according to claim 9, wherein obtaining the authentication vector comprises monitoring communication from the HLR server over the SS7 network, and extracting the authentication vector from the monitored communication.

15. The method according to claim 9, wherein the encryption key is derived from the authentication vector in accordance with an Extensible Authentication Protocol (EAP) selected from the group consisting of: EAP-Subscriber Identity Module (EAP-SIM), and EAP-Authentication and Key Agreement (EAP-AKA).

16. The method of claim 9, wherein the authentication vector is issued by the HRL by using at least one of (i) a Visitor Location Register (VLR) server that uses a Signaling System 7 (SS7) protocol, obtains access to an SS7 network, uses the SS7 protocol to obtain the at least one authentication vector from the HLR server, and does not serve the cellular network, (ii) an interrogation device that operates independently of any cooperation with the cellular network to obtain the at least one authentication vector from the HLR server, or (iii) an SS7 probe which obtains the at least one authentication vector issued by the HLR server to entities on the SS7 network.

17. A computer software product comprising a tangible non-transitory computer-readable medium in which program instructions are stored, which instructions, when read by one or more processors, cause the processors:

to receive at an access point, an identifier from a mobile communication terminal connected to a cellular network;

to transmit the identifier from the access point to an authentication, authorization and accounting (AAA) server, the access point separate from the mobile communication terminal; and to transmit the identifier of the mobile communication terminal from the AAA server to a first Visitor Location Register (VLR) server, the first VLR server in communication with a Home Location Register (HRL) server for the cellular network;

to transmit the identifier of the mobile communication terminal from the first VLR to the HLR;

to receive at the VLR an authentication vector from the HRL in response to transmitting the identifier to the HLR;

to provide the authentication vector to the AAA server, wherein the first VLR server is separate from a legitimate VLR server for internal to the cellular network; and subsequently, to cause the mobile communication terminal to exchange communication with the processors, over a WiFi wireless local area network (WLAN), using an encryption key that is derived from the authentication vector.

18. The computer software product according to claim 17, wherein the instructions further cause the processors to decrypt the communication, using the encryption key.

19. The computer software product according to claim 17, wherein the identifier is an International Mobile Subscriber Identity (IMSI).

20. The computer software product according to claim 17, wherein, the authentication vector is issued by the HRL by using at least one of (i) a Visitor Location Register (VLR) server that uses a Signaling System 7 (SS7) protocol, obtains access to an SS7 network, uses the SS7 protocol to obtain the at least one authentication vector from the HLR server, and does not serve the cellular network, (ii) an interrogation device that operates independently of any cooperation with the cellular network to obtain the at least one authentication vector from the HLR server, or (iii) an SS7 probe which obtains the at least one authentication vector issued by the HLR server to entities on the SS7 network.

* * * * *